United States Patent
Blom et al.

(10) Patent No.: US 8,645,680 B2
(45) Date of Patent: Feb. 4, 2014

(54) SENDING MEDIA DATA VIA AN INTERMEDIATE NODE

(75) Inventors: Rolf Blom, Jarfalla (SE); Yi Cheng, Sundbyberg (SE); John Mattsson, Taby (SE); Mats Naslund, Bromma (SE); Karl Norrman, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 361 days.

(21) Appl. No.: 12/997,913

(22) PCT Filed: May 6, 2009

(86) PCT No.: PCT/EP2009/055490
§ 371 (c)(1),
(2), (4) Date: Dec. 14, 2010

(87) PCT Pub. No.: WO2010/003713
PCT Pub. Date: Jan. 14, 2010

(65) Prior Publication Data
US 2011/0093698 A1   Apr. 21, 2011

Related U.S. Application Data

(60) Provisional application No. 61/061,798, filed on Jun. 16, 2008.

(51) Int. Cl.
*H04L 29/06* (2006.01)

(52) U.S. Cl.
USPC ............................................. 713/153; 726/12

(58) Field of Classification Search
USPC ............................................. 713/153; 726/12
See application file for complete search history.

(56) References Cited

U.S. PATENT DOCUMENTS

2004/0117500 A1* 6/2004 Lindholm et al. ............ 709/231
2004/0184603 A1* 9/2004 Pearson et al. ................. 380/28

(Continued)

FOREIGN PATENT DOCUMENTS

WO  2006045033 A1  4/2006
WO  2008004102 A2  1/2008

OTHER PUBLICATIONS

3GPP: "3rd Generation Partnership Project ; Technical Specification Group Services and System Aspects; IMS media plane security (Release 8)"; 3GPP Draft; S3-080512-V3-33828V070-ATT, 3rd Generation Partnership Project (3GPP) , Mobile Competence Centre ; 650, Route Des Lucioles; F-06921 Sophia-Antipolis Cedex; France, vol. SA WG3, No. Vancouver,Apr. 19, 2008; pp. 1-27 XP050280751.

(Continued)

*Primary Examiner* — Kambiz Zand
*Assistant Examiner* — Michael Guirguis
(74) *Attorney, Agent, or Firm* — Rothwell, Fig, Ernst & Manbeck P.C.

(57) ABSTRACT

A method and apparatus for sending protected media data from a data source node to a client node via an intermediate node. The data source node establishes a first hop-by-hop key to be shared with the intermediate node and an end-to-end key to be shared with the client node. A single security protocol instance is configured and used to trans-protocol form data from a media stream into transformed data using the keys. The transformed data is then sent to the intermediate node. The intermediate node uses the first hop-by-hop key to apply a security processing to the transformed data, and establishes a second hop-by-hop key with the client node. A second transformation is performed on the transformed data using the second hop-by-hop key to produce further transformed media data, which is then sent to the client node. At the client node a single security protocol instance is configured with the second hop-by-hop key and the end-to-end key, which are used to apply further security processing to the transformed media data.

14 Claims, 6 Drawing Sheets

(56) References Cited

U.S. PATENT DOCUMENTS

2007/0147620 A1* 6/2007 Zheng et al. .................. 380/277
2009/0307484 A1* 12/2009 Zhang et al. .................. 713/153

OTHER PUBLICATIONS

Blom, et al.; "SRTP Store-and-Forward Use Cases and Requirements; Draft-Mattsson-SRTP-Store-and-Forward-02", Internet Engineering Task Force, IETF; Standard Working Draft, Internet Society (ISOC) Geneva, Switzerland, No. 2, Mar. 9, 2009, pp. 1-25, XP015061557.
Ono, et al.; "End-to-middle Security in the Session Initiation Protocol (SIP)"; IETF Standard-Working-Draft, Internet Engineering Task Force, IETF, vol. sip, No. 6, Jul. 7, 2007, pp. 1-30, XP015051686.
Zhang: "A Multilayer IP Security Protocol for TCP Performance Enhancement in Wireless Networks" IEEE Journal on Selected Areas in Communications, IEEE Service Center, Piscataway, US, vol. 22, No. 4, May 1, 2004 pp. 767-776, XP011112023.
Office Action issued in corresponding Chinese Application No. 200980122789.5 on Apr. 3, 2013, 10 pages.

* cited by examiner

SENDING MEDIA DATA VIA AN INTERMEDIATE NODE

CROSS REFERENCE TO RELATED APPLICATION(S)

This application is a 35 U.S.C. §371 National Phase Entry Application from PCT/EP2009/055490, filed May 6, 2009, and designating the United States. This application also claims the benefit of U.S. Patent Application No. 61/061,798 filed Jun. 16, 2008, the disclosure of which is incorporated herein in its entirety by reference.

TECHNICAL FIELD

The invention relates to the field of securely sending media data via an intermediate node.

BACKGROUND

The Real-time Transport Protocol (RTP) is a protocol for delivering audio and video media data over a packet switched network. RTP is used for transporting real-time and streaming media data, such as interactive audio and video. It is therefore used in applications such is IPTV, conferencing, Voice over IP (VoIP).

Secure Real-time Transport Protocol (SRTP), specified in IETF RFC 3711, is a transport security protocol that provides a form of encrypted RTP. In addition to encryption, it provides message authentication and integrity, and replay protection, in unicast, multicast and broadcast applications. SRTP is used to protect content delivered between peers in an RTP session. SRTP is a transport security protocol and it is only intended to protect data during transport between two peers running SRTP. In particular, it does not protect data once it has been delivered to the endpoint of the SRTP session. In addition, the sending peer provides the protection by way of encryption of the media data, in other words it is assumed that the sending peer has knowledge of all keying material and is the one applying the protection of the data.

RTP is closely related to RTCP (RTP control protocol), which can be used to control the RTP session, and similarly SRTP has a sister protocol, called Secure RTCP (or SRTCP). SRTCP provides the same security-related features to RTCP as the ones provided by SRTP to RTP.

Utilization of SRTP or SRTCP is optional to utilization of RTP or RTCP; but even if SRTP/SRTCP are used, all provided features (such as encryption and authentication) are optional and can be separately enabled or disabled. The only exception is the message authentication/integrity feature, which is indispensably required when using SRTCP. Confidentiality protection in SRTP and SRTCP covers the payload, while integrity protection covers the payload and the full packet header.

In some cases it is desirable to introduce an intermediate node between the SRTP sender and the SRTP receiver. Examples of such situations include the use of Store and Forward mailboxes, network answering machines, and caching of IPTV content for more efficient, local access to content. The SRTP intermediate node must be able to resend received SRTP protected packets using an independent RTP session using new session parameters, without having to decrypt and re-encrypt each packet. This causes problems, since some session parameters affect the encryption and integrity protection. Furthermore, the SRTP intermediate node should not be able to access the plaintext media data in each packet, but should be able to check the integrity of each packet in order not to waste storage space on non-authentic content.

It should be noted that transparent end-to-end Packet Switched Streaming Service (PSS), described in TS 26.234, defines an encryption transform which is applied to media data before SRTP is involved in the processing of the data. This corresponds to tunnelling of the PSS protocol inside the SRTP protocol. In this case, an intermediate node in the form of a streaming server is located between the SRTP sender and the SRTP receiver, and the streaming server has no knowledge of the encryption key for the encryption transform. The content is therefore integrity protected using SRTP between the streaming server and the SRTP receiver. The encryption transform specified for PSS encrypts each data unit using 128-bit AES in counter mode for the encryption. Each SRTP packet delivered from the streaming server to the SRTP receiver contains one encrypted data unit. Data is encrypted between the SRTP sender and the SRTP receiver using AES-CTR, and data is integrity protected between the streaming server and the SRTP receiver using SRTP. A session nonce is sent from the SRTP sender to the streaming server, and a further session nonce is sent from the streaming server to the SRTP receiver. Assuming that the SRTP receiver shares the encryption key with the SRTP sender, the SRTP receiver only needs to be able to re-construct the same initialization vector (IV) as was used by the SRTP sender when the data unit was encrypted. The IV for each data unit is constructed from a sequence number which is transported with each data unit combined with a nonce (which remains the same through out the entire session and is signalled out of band before the streaming begins). The construction of the 128-bit IV is defined as:

$$IV = (nonce * 2^{16}) XOR (IVSN * 2^{16}) \quad \text{(Math 1)}$$

However, a problem with PSS is that it does not provide the same information as SRTP; for example, time stamps and so on, as it is only applied to codec data. Furthermore, PSS can be inefficient in terms of bandwidth, as each payload protected using PSS requires its own header. Similarly, tunnelling data using one protocol within another to transport the data requires different headers for each data layer.

SUMMARY

While not specified in the current RFC3711, key management for SRTP and SRTCP can be performed independently of each other, and so different keying material and policy parameters could be used for each protocol. It is an object of the invention to allow RTP data to be sent via an intermediate node in a more efficient way than the PSS method.

According to a first aspect of the invention, there is provided a method of sending protected media data from a data source node to a client node via an intermediate node. The media data source node establishes a first hop-by-hop key to be shared with the intermediate node and an end-to-end key to be shared with the client node. A single security protocol instance is configured and used to transform data relating to a media stream into transformed data using the end-to-end key and the first hop-by-hop key. The transformed media data is then sent to the intermediate node. The intermediate node uses the established first hop-by-hop key to apply a first security processing to the transformed media data, and establishes a second hop-by-hop key with the client node. A second transformation is performed on the transformed media data using the second hop-by-hop key to produce further transformed media data, which is then sent to the client node. At the client node a single security protocol instance is configured with the second hop-by-hop key and the end-to-end key. The second hop-by-hop key is used to apply a second security processing to the received further transformed media data, and the end-to-end key is used to apply a third security processing to the transformed media data. By using a single security protocol instance to transform the data, data transformed using both a hop by hop key and an end to end key requires only a single header, and an intermediate node does not have access to the plaintext data.

In an optional embodiment, either or both of the first hop-by-hop key and the second hop-by-hop key is derived from the end-to-end key. Similarly, the second hop-by-hop key is optionally derived from the end-to-end key.

The first, second and third security processing optionally comprises any or all of integrity protection, verification, encryption and decryption. For example, the second security processing may be verifying the integrity of the data, and the third security processing may be decryption. It should be noted that the second processing at the client node is in correspondence with, but does not need to be identical to, the second transformation at the intermediate node. For instance, if the second transformation at the intermediate node comprises encryption, then the second security processing at the client node may comprise decryption, and so on.

It will be appreciated that in an optional embodiment, the protected, transformed data may be sent via one or more further intermediate nodes.

The method optionally comprising informing the intermediate node that the transformed media data is protected using the end-to-end key.

As an option, the method comprises deriving an end-to-end Message Authentication Code using the end-to-end-key, and deriving a hop-by-hop Message Authentication Code using the first hop-by-hop key. The end-to-end Message Authentication Code and the hop-by-hop Message Authentication Code are then sent as part of the data.

The single instance of a security protocol is optionally a single instance of the Secure Real-Time Transport Protocol.

As an option, the step of transforming data relating to a media stream into transformed data using the end-to-end key and the first hop-by-hop key using a single security protocol instance comprises transforming payload data using the end-to-end key and header data using the first hop-by-hop key.

According to a second aspect of the invention, there is provided a media data source node that is provided with a source of data relating to a media stream. A first processor function is provided for generating a hop-by-hop key and an end-to-end key. A second processor function is also provided for configuring a single security protocol instance and using it to transform the data using the end-to-end key and the hop-by-hop key. A first transmitter function is used for sending the hop-by-hop key to an intermediate node, a second transmitter function is provided for sending the end-to-end key to a client node, and a third transmitter function is provided for sending the transformed data to the intermediate node for forwarding to the client node. The use of a single security protocol instance to transform the data using both the hop by hop key and the end to end key means that the transformed data requires only a single header, and an intermediate node does not have access to the plaintext data.

As an option, at least one of the first processor function is arranged to generate the hop-by-hop key by deriving it from the end-to-end key.

As a further option, the first transmitter function is also arranged to send a signal to the intermediate node informing the intermediate node that the transformed media is protected using the end-to-end key.

In an optional embodiment, the first processor function is arranged to derive an end-to-end Message Authentication Code (MAC) using the end-to-end key, and a hop-by-hop MAC using the hop-by-hop key. The second processor function is arranged to include the end-to-end MAC and the hop-by-hop MAC as part of the data.

As a further option, the second processor function is arranged to use a Secure Real-Time Transport Protocol instance.

Optionally, the second processor function is arranged to transform payload data using the end-to-end key and header data using the first hop-by-hop key.

According to a third aspect of the invention, there is provided an intermediate node for use in a communication network. A first receiver function is provided for receiving from a media data source node a hop-by-hop key usable for security processing of transformed data relating to a media stream. A second receiver function is provided for receiving from the media data source node the transformed data. A first processing function is provided for security processing of the received data using the received hop-by-hop key, and a second processing function is provided for establishing a second hop-by-hop key and performing a transformation on the transformed media data to produce further transformed media data. A first transmitter function is provided for sending the second hop-by-hop key to a client node, and a second transmitter function is provided for sending the further transformed media data to the client node. In this way, the intermediate node does not have access to the original media data. The second hop-by-hop key is optionally established by modifying the first hop-by-hop key.

As an option, the first processing function is arranged to perform a verification security processing step.

According to a fourth aspect of the invention, there is provided a client node for receiving transformed data relating to a media stream. A first receiver function is provided for receiving an end-to-end key from a media data source node. A second receiver function is provided for receiving a hop-by-hop key from an intermediate node. A third receiver function is provided for receiving the transformed data from the intermediate node. A processor function applies using a single security protocol instance, a first security processing to the received transformed media data, and then applies a further security processing to the transformed media data. For example, the first security processing may check the integrity of the transformed media data, and the second security processing may decrypt the transformed media data.

As an option, the first and second security functions applied by the processor are selected from any of verification, decryption, encryption and integrity protection.

According to a fifth aspect of the invention, there is provided a computer program, comprising computer readable code which, when run on a media data source node, causes the media data source node to establish a first hop-by-hop key to be shared with an intermediate node and an end-to-end key to be shared with a client node, configure a single security protocol instance and use it to transform data relating to a media stream into transformed data using the end-to-end key and the first hop-by-hop key, and then to send the transformed media data to the intermediate node.

According to a sixth aspect of the invention, there is provided a computer program, comprising computer readable code which, when run on an intermediate node in a communication network, causes the intermediate node to perform security processing of transformed media data received from a media data source node using a hop-by-hop key received from the media data source node. A second hop-by-hop key is established and transformation is performed on the transformed media data to produce further transformed media data. The second hop-by-hop key and the further transformed media data are sent to the client node.

According to a seventh aspect of the invention, there is provided a computer program, comprising computer readable code which, when run on a client node, causes the client node to apply, using a single security protocol instance, a security processing to transformed media data using a hop-by-hop key received from an intermediate node and a further security processing to the transformed media data using an end-to-end key received from a media data source node.

According to an eighth aspect of the invention, there is provided a computer program product comprising a computer readable medium and a computer program as described above in any of the second, third or fourth aspects of the invention, wherein the computer program is stored on the computer readable medium.

DETAILED DESCRIPTION

Figure 1:
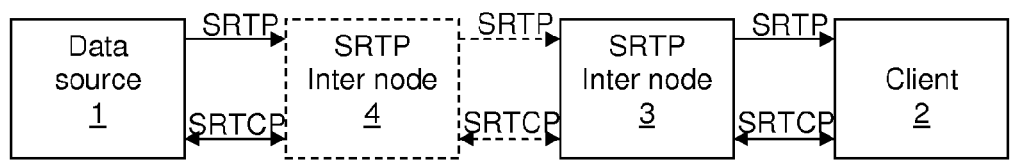
FIG. 1 illustrates schematically in a block diagram a signalling and network architecture according to an embodiment of the invention.

Referring to FIG. 1, there is shown an example network architecture according to an embodiment of the invention. A media data source node 1 wishes to send SRTP media data packets to a client node 2. The media data packets are sent via an SRTP intermediate node 3, and may be sent via a plurality of SRTP intermediate nodes 4 (shown in FIG. 1 as one more SRTP intermediate node, but may be any number). The SRTP intermediate node 3 is arranged to provide later delivery of the media data packets to the client node 2.

Figure 2:
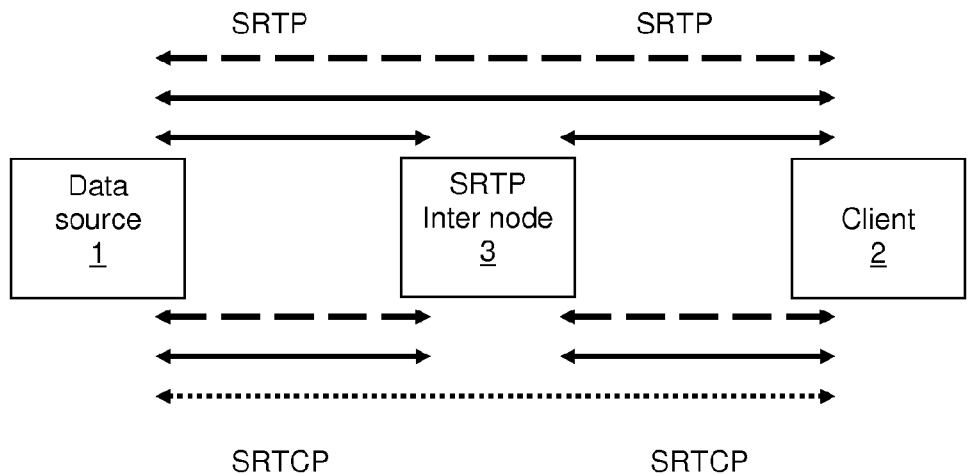
FIG. 2 illustrates schematically in a block diagram a signalling and network architecture for a trust model according to an embodiment of the invention.

Referring now to FIG. 2, a required trust model for the architecture of FIG. 1 is illustrated. The SRTP data packets between the media data source node 1 and the client node 2 must be confidentiality protected (illustrated by a dashed line) and their integrity assured (illustrated by a solid line). Furthermore, the integrity of data packets must be assured between the media data source node 1 and the SRTP intermediate node 3, and between the SRTP intermediate node 3 and the client node 2. Information sent using SRTCP must be confidentially and integrity protected between the media data source node 1 and the SRTP intermediate node 3, and between the SRTP intermediate node 3 and the client node 2. As an option, SRTCP packets may have their integrity assured between the media data source node 1 and the client node 2.

The invention is concerned with key management, and integrity and confidentiality protection for data sent via an intermediate node, such as the SRTP intermediate node 3. By using special key management and new cryptographic transforms, the above mentioned trust model is realized.

A Message Authentication Code (MAC) is introduced into the signalling for each of the RTP and the RTCP streams. One MAC is keyed using a key derived from a so-called e2e-Key (end-to-end key), which is used to control protection of the RTP media data between the media data source node 1 and the client node 2. Another MAC is keyed using a key derived from a so-called hop-by-hop-Key used to protect the RTCP. The hop-by-hop key is distributed to the SRTP intermediate node 3, which allows the SRTP intermediate node 3 to handle incoming hop-by-hop RTCP traffic and also check the hop-by-hop MAC on the media traffic (RTP) before storing the RTP media stream. However, the SRTP intermediate node 3 is not able to access the RTP plaintext media when it is encrypted using keying material derived from the e2e-Key. The client node 2 is able to verify the e2e MAC by use of a key derived from the e2e-Key. The MAC field in the original SRTP signalling is split into two parts, an inner MAC for end-to-end protection and one outer MAC for hop-to-hop protection. In certain embodiments, described fully below, other fields in the SRTP signalling are also split in a similar manner, for example the MKI (Master Key Identifier) field.

Figure 3:
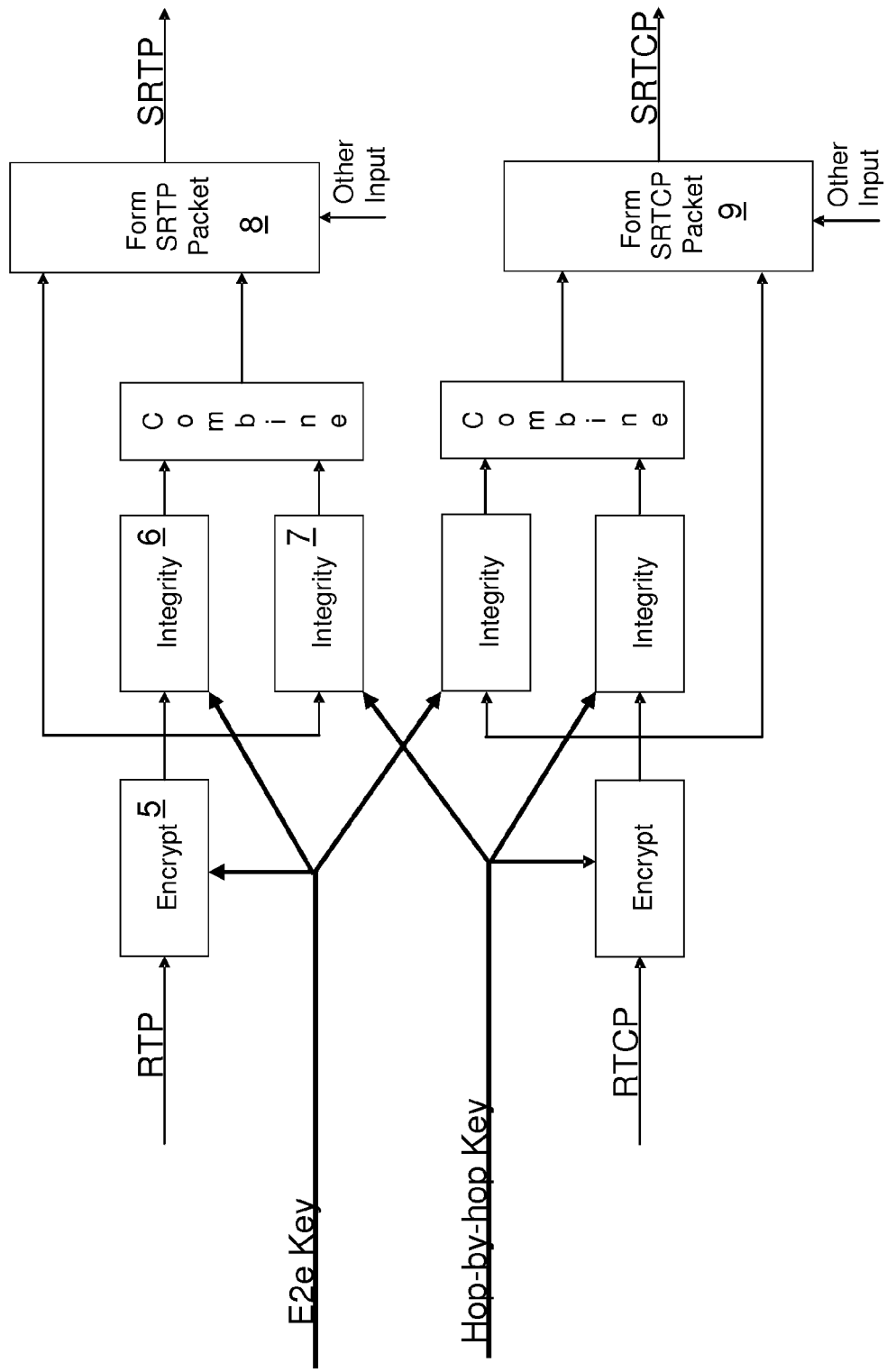
FIG. 3 is a signalling diagram illustrating signalling according to an embodiment of the invention.

FIG. 3 illustrates the principles of the cryptographic transforms used according to an embodiment of the invention. The keys used for the protection mechanisms are derived in a secure way from the e2e and the hop-by-hop keys. RTP signalling is encrypted using an encryption function 5 using an e2e-Key, and keys to check the integrity are formed using integrity functions 6, 7 using the e2e-Key and a hop-by-hop key respectively, to form SRTP data packets 8. Similar principles apply to RTCP signalling to form SRTCP data packets 9. An exemplary security design ensures that the outer integrity protection (the integrity protection keyed by the e2e-Key) of the RTP signalling covers at least the confidentiality protected part, and the inner MAC resulting from the inner protection transform. All other fields can also be covered by the outer MAC. Furthermore, the inner integrity protection (security transform) of the RTCP signalling should cover the plaintext payload of the RTCP. It should be noted that other key management approaches are also possible and that the described key derivations mainly serve to simplify the key management in comparison to e.g. the option of using totally random and independent keys for each security processing step.

Figure 4:
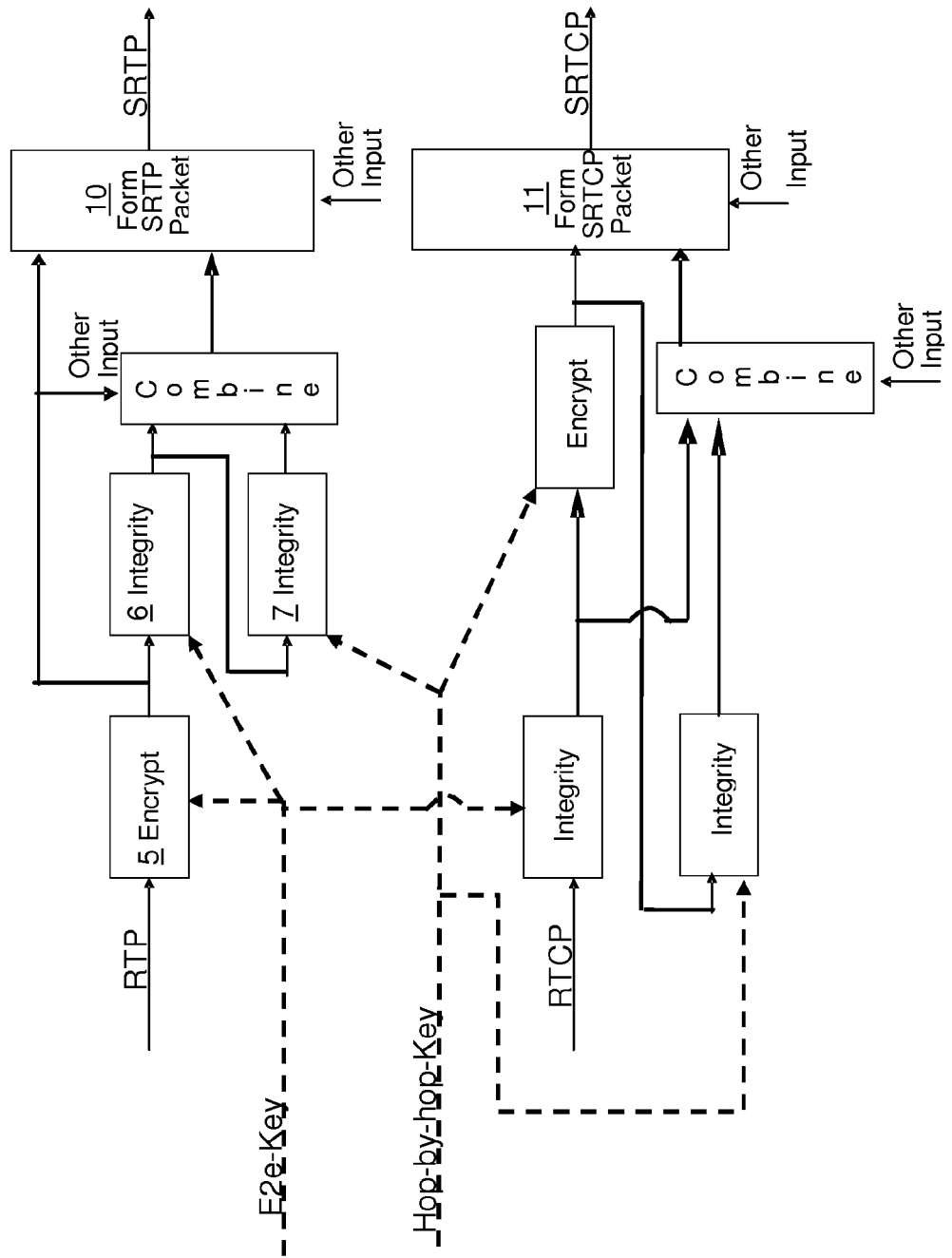
FIG. 4 is a signalling diagram illustrating signalling according to a further embodiment of the invention.

FIG. 4 illustrates signalling according to a further embodiment of the invention. For RTP signalling, the plaintext payload of an RTP packet is first encrypted and integrity protected using the e2e key and then the hop-by-hop key. The resultant combined "inner" transform is independent of the RTP header and may also be combined with other parameters. The output 10 from the inner RTP transform is a new payload which contains the encrypted original RTP payload, a MAC and other parameters if used. Examples of other parameters include an IV and a MKI. The outer transform takes the RTP header as input and may also depend on yet "other" parameters (and in principle it is a standard SRTP transform with the new payload from the inner transform as the SRTP payload). The outer transform key is here derived from the hop-by-hop- Key. The final output contains the RTP header, the new "payload" resulting from the inner transform, the MAC from the outer transform and the "other" parameters valid for the outer transform, e.g. a MKI.

The RTCP processing starts with having the RTCP payload integrity protected by an inner transform. The transform is independent of the RTCP header but may depend on "other" parameters. The key may, for instance, be derived from the e2e-Key. The output of the inner RTCP transform is a new "payload" which contains the original payload in plain, a MAC and possibly other parameters; typically an IV but there may also be a MKI, etc. This new "payload" is then protected by the outer transform which may have a confidentiality part and an integrity protection part. The outer transform is keyed with a key derived from the hop-by-hop-Key and it may depend on "other" parameters. The output from the outer RTCP transform contains the encrypted new "payload", an outer MAC and possibly "other" parameters; typically a MKI, etc.

Figure 5:
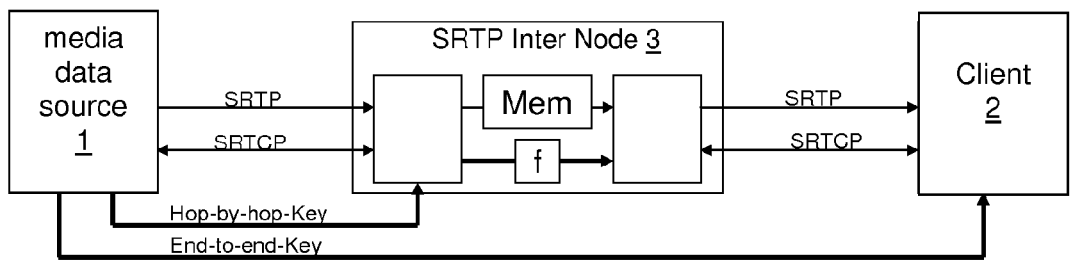
FIG. 5 illustrates schematically signalling and network architecture according to an embodiment of the invention.

FIG. 5 illustrates how the SRTP intermediate node 3 is connected between the media data source node 1 and the client node 2. The media data source node 1 establishes a hob-by-hop-Key with the SRTP intermediate node 3, either directly or via a key server. The hop-by-hop-Key is used to protect the traffic between the media data source node 1 and the SRTP intermediate node 3. In an embodiment, the SRTP media is integrity protected between the media data source node 1 and the SRTP intermediate node 3, and the SRTCP signalling is encrypted and integrity protected between the media data source node 1 and the SRTP intermediate node 3. The media data source node 1 also establishes an end-to-end-Key with the client node 2, either directly or via a key server. This key is used to derive keying material to encrypt and integrity protect the SRTP media between the media data source node 1 and the client node 2. These two keys may be derived from a master key via a secure key derivation function. In this case, the media data source node 1 establishes this master key with the client node 2 and sends the derived hop-by-hop key to the SRTP intermediate node 3.

The same hop-by-hop key may not be used between the SRTP intermediate node 3 and the client node 2 as is used on the link between the media data source node 1 and the SRTP intermediate node 3, and so the hop-by-hop key may be modified at the SRTP intermediate node 3 before the hop-by-hop key is used between the SRTP intermediate node 3 and the client node 2. This has the advantage that there is no need to perform any form of key management between the SRTP intermediate node 3 and the client node 2 for the protection of the link between the SRTP intermediate node 3 and the client node 2.

In a specific embodiment of the invention, the set-up of the link between the media data source node 1 and the SRTP intermediate node 3 is performed according to the standard (Session Description Protocol, SDP, and Multimedia Internet Keying, MIKEY). An example is for the media data source node 1 to specify a transform that only contains integrity protection of the SRTP data and hints that the RTP is end-to-end protected, thus giving the information needed by the SRTP intermediate node to correctly handle the incoming stream. The RTP MAC is defined in such a way that the hop-by-hop key is used and that only a fraction of the MAC field is used. For example, half of the MAC field is reserved for an inner "e2e MAC" between the media data source node 1 and the client node 2, and the remaining bits are used for the outer "hop-by-hop MAC" between the media data source node 1 and the SRTP intermediate node 3. The SRTP intermediate node 3 may strip the second half of the MAC after having verified it and before storing the media data packets for future sending to the client node 2.

Figure 6:
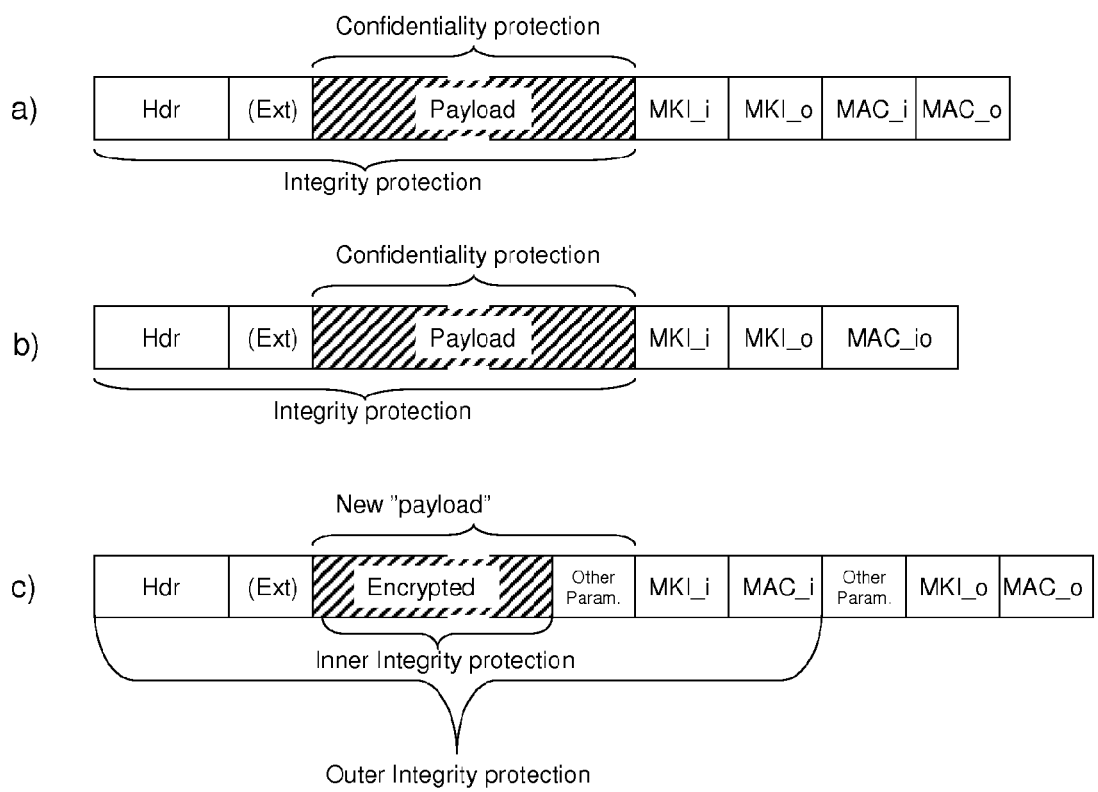
FIG. 6 illustrates schematically in a block diagram example packet formats according to embodiments of the invention.

The cryptographic transform indicated to the SRTP intermediate node 3 must hint at which end-to-end transform is used to protect RTCP or RTP data packets. This is in order to inform the SRTP intermediate node 3 about the format of the SRTP or SRTCP packet. FIG. 6 illustrates examples of packet layout. FIG. 6a illustrates the format of a packet 5 sent to a SRTP intermediate node 3. In addition to a split MAC field, it is also necessary to provide a split MKI field. An "inner" MKI (MKi_i) is used to convey the original end-to-end MKI, and an "outer" MKI (MKI_o) is used for the intermediate node-client link. Similarly, inner and outer MACs are provided. Packets to the client node 2 may have the format illustrated in FIG. 5b, in which a single MAC is provided in the MAC field. The format of a packet illustrated in FIG. 6c includes a payload that includes encrypted data and another parameter, which has an "inner" integrity protection. Outer integrity protection is provided to the payload, the header, and the inner MKI (MKI_i) and the inner MAC (MAC_i). This format makes it possible to treat the inner and outer transforms independently. The intermediate node 3 does not need to know any details of the inner transform and it can independently negotiate an appropriate outer transform with the receiver 2 independently of the transform used for the incoming hop.

The protection of RTCP signalling is specified in the normal way, i.e. it is typically applied first hop-by-hop between the data source 1 and the SRTP intermediate node 3, and then hop-by-hop between the SRTP intermediate node 3 and the client node 2. However, if end-to-end integrity is applied then this has to be hinted to the client node 2. The hint must make it possible for the client node 2 to determine the key and the algorithm used to protect the RTCP signalling. That is, the client node 2 must be given configuration information (via key management) that tells the client node 2 to expect both an inner and an outer MAC for the e2e and the hop-by-hop part.

The set-up of the link between the SRTP intermediate node 3 and the receiver (which may be the client node 2 or another intermediate node) is controlled by the SRTP intermediate node 3, as the SRTP intermediate node 3 selects the transforms used. The SRTP intermediate node 3 must select a transform that is compatible with the end-to-end transform (hinted by the media data source node 1). In other words, it must specify the same RTP confidentiality protection algorithm and compatible end-to-end MAC format.

If the receiver acts as yet another intermediate node, then the explicit two-part MAC described above must be used in the outgoing session. Otherwise, different types of combined MACs can be implemented, and the receiver would not be able to determine how to treat the incoming MAC. Note also that due to the modifying of the two part MAC key at each hop, each entity receiving packets may be informed of how many proxies (further intermediate nodes) have been involved in the delivery to be able to determine how to treat the incoming MAC, in order to modify the RTCP key the correct number of times.

Turning now to specific issues with MACs, for the RTP MAC used between the SRTP intermediate node 3 and the client node 2 (or another intermediate node), some different approaches are possible. Assuming P is the RTP packet, MAC_I is the e2e MAC tag for RTP stored in the intermediate node, and K is the hop-by-hop key used between SRTP intermediate node 3 and client node 2 to protect the RTP traffic:

1. The SRTP intermediate node adds a "half-size" MAC (MAC_o) concatenated with the e2e MAC (MAC_I), as described above, so the packet sent from the SRTP intermediate node 3 is as follows:

$$P\|MAC\_I\|MAC(K,P\|MAC\_I) \quad \text{(Math 2)}$$

2. Cascade of MACs. The SRTP intermediate node sends $$P\|MAC(K,P\|MAC\_I) \quad \text{(Math 3)}$$

The client node 2 computes MAC_I first before evaluating the MAC. This is thus a combiner inner/outer MAC, MAC_io 3. Some other inner/outer MAC-combination, e.g.

$$P\|G(MAC\_I,MAC(K,P)) \quad \text{(Math 4)}$$

where G may be XOR (eXclusive-OR) for instance.

In the above equations, MAC is a message authentication code function, and $\|$ denotes concatenation. Note that even though concatenation is used to combine the inputs to the MAC function, a person skilled in the art would appreciate that the inputs may be combined in other ways. Further note that the order of the inputs is not important, that the inputs may be used only indirectly, for example instead of inputting MAC_I directly, a function of MAC_I with some other parameter, e.g., an identifier for the link, the intermediate node, sender or receiver may be input.

If a voucher/ticket-based solution of key management is used (for example Kerberos authentication) to distribute the keys, the voucher/ticket containing the e2e keys is stored at the SRTP intermediate node 3 together with the media data content, and can be downloaded by the client node 2 at "playback". The media data source node 1 can derive a hop-by-hop key from the key in the voucher to use together with the intermediate node, e.g. over MIKEY (see RFC3830). However, a drawback of this is that the media data source node 1 requires a special procedure depending on whether it is the actual client node 2 who "answers" the call, or if it is the SRTP intermediate node 3 that acts as a proxy for the receiver.

The media data source node 1 would, in one example, receive tickets (indicating the e2e keys) from a key management server node and would be able derive the hop-by-hop keys for the connection to the intermediate node. Alternatively, the intermediate node-receiver link could also be setup using MIKEY.

Figure 7:
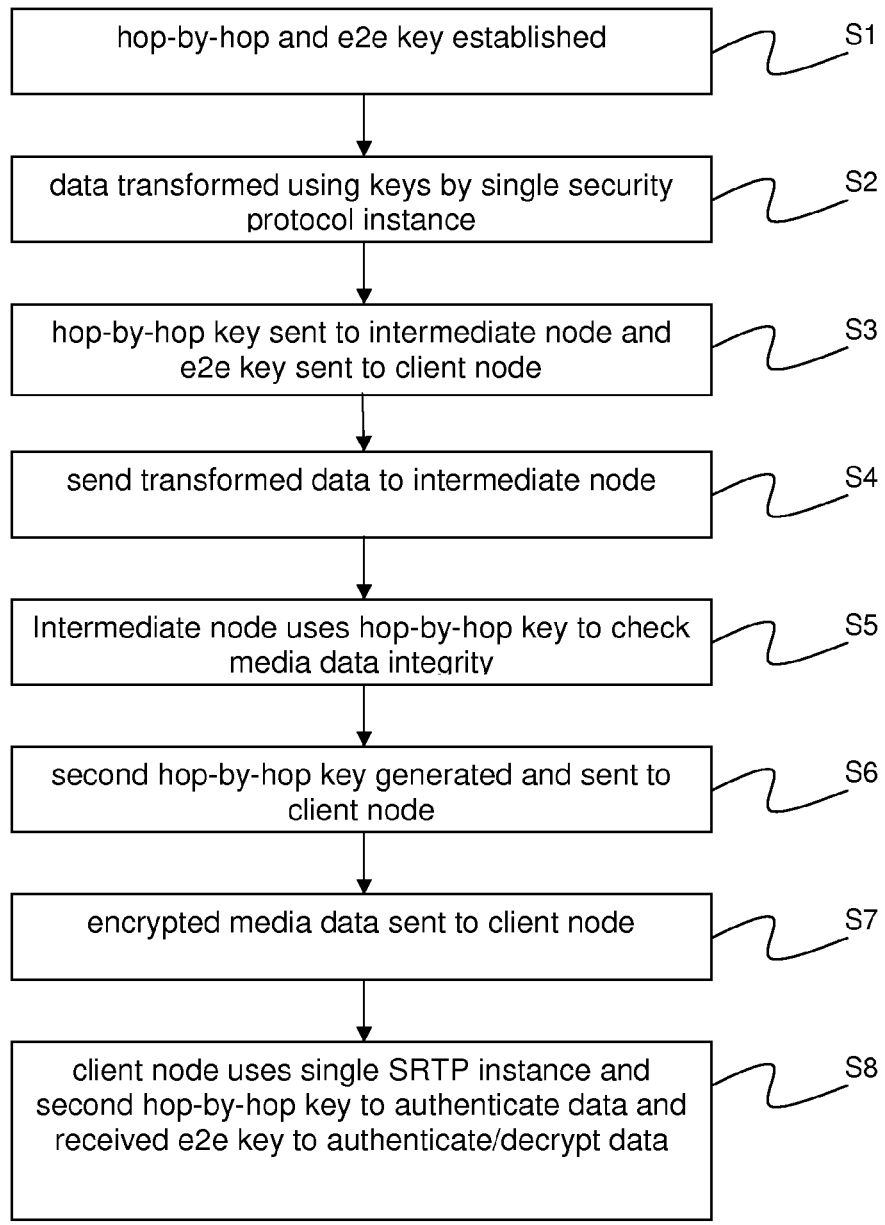
FIG. 7 is a flow chart showing the steps of a method according to an embodiment of the invention.

Referring now to FIG. 7, a step-by-step description of an embodiment of the invention is provided. The following numbering corresponds to the numbering used in FIG. 6.

S1. The media data source node 1 generates the end-to-end-Key and the hop-by-hop-Key. In a specific embodiment of the invention, this is performed by establishing a master key from which the end-to-end-Key and the hop-by-hop-Key are derived.

$$\text{end-to-end-Key}=F(\text{master key},\text{"e2e"},\ldots) \quad \text{(Math 5)}$$

$$\text{hop-by-hop-Key}=G(\text{master key},\text{"hop-by-hop"},\ldots) \quad \text{(Math 6)}$$

where F is either identity mapping of the master key or a PRF, and G is a PRF (Pseudo-random Function).

S2. The media data source node 1 determines the end-to-end protection and the protection for the first hop. In principle, this means that the media data source node 1 decides on two transforms applied sequentially, first the end-to-end part and then the hop-by-hop part. The end-to-end transform contains integrity and confidentiality for SRTP and integrity protection for SRTCP, while the hop-by-hop transform contains integrity protection for SRTP and SRTCP and optionally also confidentiality for SRTCP. The transforms and keys are configured to be applied within a single SRTP protocol instance at the media data source node.

S3. The media data source node 1 distributes the end-to-end key to the client node 2 and the hop-by hop key to the SRTP intermediate node 3. The end-to-end distribution may be deferred to a later time e.g. by temporary storage in another node associated with the SRTP intermediate node or the SRTP intermediate node itself as described below. The information sent to the client node 2 also includes information about the end-to-end transform. The SRTP intermediate node 3 needs to know certain features (in particular the length of the MAC but also use of MKI, etc.) of the end-to-end transform in order for the SRTP intermediate node 3 to use certain MAC schemes described above and also to indicate the format of the SRTP packets, in order for the SRTP intermediate node 3 to determine where the MAC is located in each packet. The transport of the end-to-end key to client node 2 may be in a voucher via the SRTP intermediate node 3. Other information about the end-to-end transform may be part of the Session Description Protocol (SDP), which can be used to describe SRTP initialization parameters. In the SRTP set-up for hops to proxies, the SDP part contains information regarding hop-by-hop protection. The SDP for the last hop is configured to carry information about both the hop-by-hop and end-to-end transforms.

S4. The media data source node 1 sets up the SRTP/SRTCP link to the SRTP intermediate node 3 and starts the session in which encrypted media data is sent to the SRTP intermediate node 3.

S5. The SRTP intermediate node 3 receives the SRTP and SRTCP. The SRTP intermediate node 3 authenticates/decrypts the incoming traffic using the hop-by-hop key and stores the parts that should be forwarded. If e2e protection of RTCP is also configured, the SRTP intermediate node 3 must also store the corresponding RTCP packets.

S6. The SRTP intermediate node 3 modifies the hop-by-hop-Key, e.g. by applying a key derivation function to it and possibly other parameters in a pre-defined manner. It informs the receiver (e.g. the client node 2) about the transform it selects for the next hop. Note that other key management concepts may be applied, for example, the SRTP intermediate node 3 may select a key and forward it to the receiver.

S7. The SRTP intermediate node 3 starts the session with the client node 2 and sends the encrypted media data to the client node 2. If e2e protection of RTCP is also configured, the SRTP intermediate node 3 must (somehow) also retrieve the previously stored RTCP packets and (somehow) multiplex them into the RTCP stream between the SRTP intermediate node and the client node 2.

S8 The client node configures a single instance of the SRTP protocol with the received hop-by-hop key and end-to-end key. The client node 2, authenticates/decrypts the hop-by-hop protection using the received hop-by-hop key and, using the same SRTP protocol instance, authenticates/decrypts the end-to-end protection of the media, using the end-to-end-key previously received from the media data source node 1.

Note that a media data source node 1 may need to act differently depending on whether or not an SRTP intermediate node 3 is present. It is possible to introduce a mechanism in SRTP to allow (completely) different keys for encryption and decryption. These two keys would be delivered separately to the media data source node 1, and only the integrity key would be made available to the SRTP intermediate node 3. Note it should be possible to have completely independent end-to-end-Key and hop-by hop-Keys.

Figure 8:
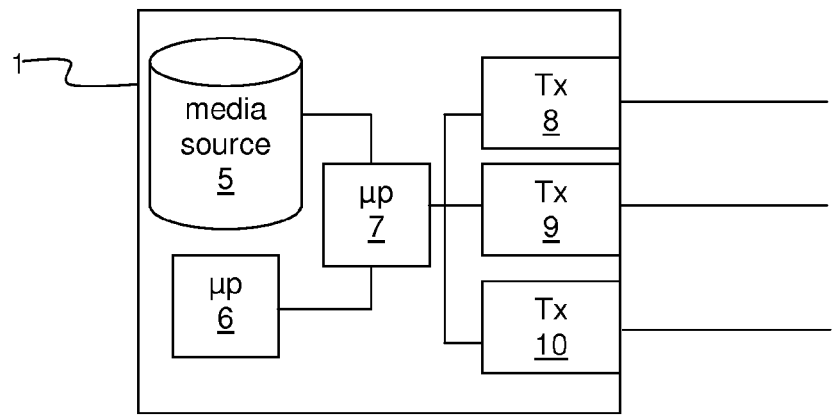
FIG. 8 illustrates schematically in a block diagram a media data source node according to an embodiment of the invention.

FIG. 8 shows a media data source node 1 according to an embodiment of the invention. The media data source node 1 is provided with a source 5 of media data (in this example shown as a memory, but it may be supplied from an external source)

and a first processor function 6 for generating the hop-by-hop key and end-to-end key. A second processor function 7 is provided for using a single security protocol instance to transform media data from the media source 5 using the end-to-end key and the hop-by-hop key, such that the hop-by-hop key is usable to check the integrity of the media data, and the end-to-end key is usable to decrypt the media data. A first transmitter function 8 is provided for sending the hop-by-hop key to the SRTP intermediate node 3, a second transmitter function 9 is provided for sending the end-to-end key to the client node 2, and a third transmitter function 10 is provided for sending the transformed media data to the SRTP intermediate node 3.

Figure 9:
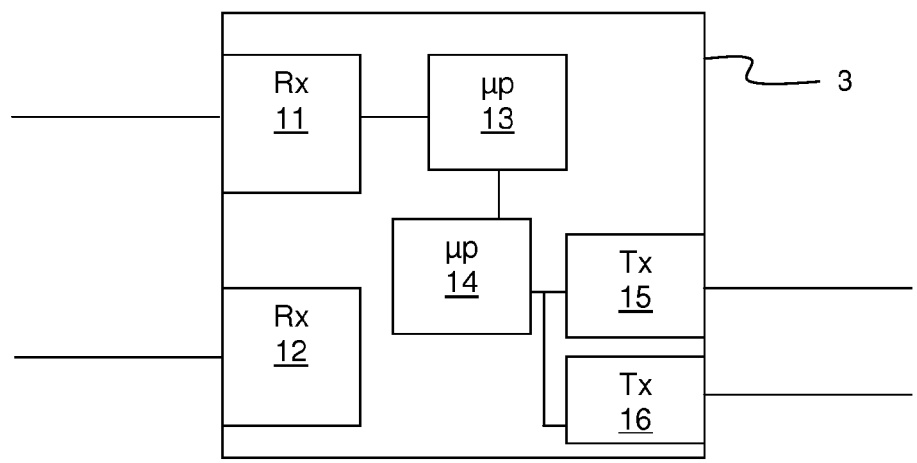
FIG. 9 illustrates schematically in a block diagram an intermediate node according to an embodiment of the invention.

Turning now to FIG. 9, there is illustrated an SRTP intermediate node 3 according to an embodiment of the invention. The SRTP intermediate node 3 is provided with a first receiver function 11 for receiving the hop-by-hop key from the media data source node 1. A second receiver function 12 is provided for receiving encrypted media data from the media source node 1. A first processor function 13 is provided for checking the integrity of the received media data using the established hop-by-hop key. A second processor function 14 is optionally provided for modifying the hop-by-hop key to create a second hop-by-hop key. A first transmitter function 15 is provided for sending the second hop-by-hop key to the client node 2, and a second transmitter function 16 is provided for sending the encrypted media data to the client node 2.

Figure 10:
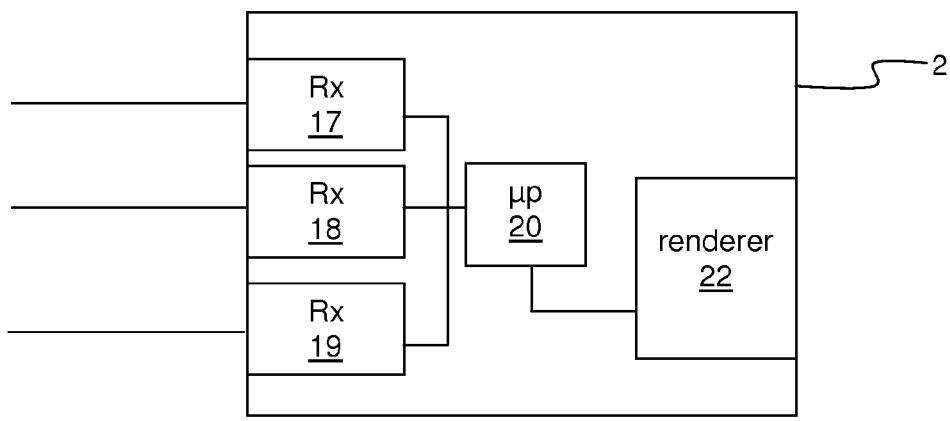
FIG. 10 illustrates schematically in a block diagram a client node according to an embodiment of the invention.

FIG. 10 illustrates a client node 2 according to an embodiment of the invention. The client node is provided with a first receiver function 17 for receiving an end-to-end key from the media data source node 1. A second receiver function 18 is provided for receiving the hop-by-hop key from the SRTP intermediate node 3, and a third receiver function 19 is provided for receiving encrypted media data from the intermediate node. A processor function 20 is used to check the integrity of the encrypted media data using the hop-by-hop key and decrypting the encrypted media data using the end-to-end key before passing the decrypted media to a media renderer 21 or other media handler.

The invention defines a SRTP transform that allows hop-by-hop integrity protection of both RTP and RTCP. Key management can be built upon existing methods like MIKEY.

The invention provides end-to-end protection of a payload stream (RTP) and hop-by-hop protection of a control stream (RTCP). Note that transforms based on the end-to-end-Key and the hop-by hop-Keys respectively may contain only part of the possible confidentiality and integrity protection procedures indicated. Typically, the end-to-end-Key would control e2e integrity and confidentiality protection for the RTP part while the hop-by-hop-key would control integrity protection for the RTP part and integrity and confidentiality protection for the RTCP.

SRTP transforms and key management are introduced that provide protection against two different end-points with two possibly independent keys. A typical example is to have the split MAC of the RTP stream keyed by the hop-by-hop-Key and the e2e-Key. Having a split MKI field (compared to a split MAC) to allow MKI control of both the hop-by-hop protection and the end-to-end protection provides an efficient method of key management. Related transforms may be used for end-to-end and hop-by-hop protection. The optional modification of the hop-by-hop-key in the SRTP intermediate node 3 avoids additional key management signalling for the link between the SRTP intermediate node 3 and the client node 2.

It will be appreciated by the person of skill in the art that various modifications may be made to the above-described embodiments without departing from the scope of the present invention.

The invention claimed is:

1. A method of sending protected media data from a data source node to a client node via an intermediate node, the method comprising:
   at the media data source node, establishing a first hop-by-hop key to be shared with said intermediate node and an end-to-end key to be shared with said client node;
   configuring a single security protocol instance and using it to transform data relating to a media stream into transformed data using the end-to-end key and the first hop-by-hop key;
   sending the transformed media data to the intermediate node;
   at the intermediate node, using the established first hop-by-hop key to apply a first security processing to the transformed media data;
   at the intermediate node, establishing a second hop-by-hop key with the client node, and performing a second transformation on the transformed media data using the second hop-by-hop key to produce further transformed media data;
   at the intermediate node, sending the further transformed media data to the client node;
   at the client node, configuring a single security protocol instance with the second hop-by-hop key and the end-to-end key, and using the second hop-by-hop key to apply a second security processing to the received further transformed media data, and using the end-to-end key to apply a third security processing to the transformed media data.

2. The method according to claim 1, wherein at least one of said first hop-by-hop key and said second hop-by-hop key is derived from said end-to-end key.

3. The method according to claim 1, wherein any of the first, second and third security processing comprises any of integrity protection, verification, encryption and decryption.

4. The method according to claim 1, comprising sending the protected, transformed media data via a further intermediate node.

5. The method according to claim 1, further comprising informing the intermediate node that the transformed media data is protected using the end-to-end key.

6. The method according to claim 1, further comprising:
   deriving an end-to-end Message Authentication Code using the end-to-end-key;
   deriving a hop-by-hop Message Authentication Code using the first hop-by-hop key; and
   including the end-to-end Message Authentication Code and the hop-by-hop Message Authentication Code as part of the data.

7. The method according to claim 1, wherein the single security protocol instance is a Secure Real-Time Transport Protocol instance.

8. The method according to claim 1, wherein the step of transforming data relating to a media stream into transformed data using the end-to-end key and the first hop-by-hop key using a single security protocol comprises transforming payload data using the end-to-end key and header data using the first hop-by-hop key.

9. An intermediate node for use in a communication network, the intermediate node comprising:

a receiver for receiving from a media data source node a hop-by-hop key usable for security processing of transformed data relating to a media stream and for receiving a packet comprising a header portion, a payload portion that includes encrypted media data encrypted using an end-to-end key, a first authentication code generated using the end-to-end key, and a second authentication code generated using the hop-by-hop key;

a processing unit for verifying integrity of the encrypted media data, wherein the verifying step comprises calculating a third authentication code using the received hop-by-hop key and comparing the third authentication code with the second authentication code; and a transmitter for forwarding the encrypted media data and the first authentication code in response to verifying the integrity of the encrypted media data.

10. The intermediate node according to claim 9, further comprising establishing a second hop-by-hop key by modifying the first hop-by-hop key and performing a transformation on the packet using the second hop-by-hop key.

11. A non-transitory computer-readable medium comprising computer readable code which, when run on an intermediate node in a communication network, causes the intermediate node to:

receive, from a media data source node, an end-to-end key, a hop-by-hop key, and a packet that includes a header portion, a payload portion comprising encrypted media data encrypted using the end-to-end key, a first authentication code generated using the end-to-end key, and a second authentication code generated using the hop-by-hop key;

perform security processing of the packet to verify integrity of the encrypted media data, wherein the verifying comprises calculating a third authentication code using the hop-by-hop key and comparing the third authentication code with the second authentication code; and send the encrypted media and the first authentication code to the client node in response to verifying the integrity of the encrypted media data.

12. The method of claim 1, wherein the transformed media data includes an end-to-end authentication code for authentication between the media data source node and the client node and includes a hop-by-hop authentication code for authentication between the media data source node and the intermediate node.

13. The method of claim 12, wherein the further transformed media data includes a second hop-by-hop authentication code for authentication between the intermediate node and the client node.

14. The method of claim 9, wherein calculating the third authentication code is based on the header and the encrypted media data of the payload.

* * * * *

UNITED STATES PATENT AND TRADEMARK OFFICE
CERTIFICATE OF CORRECTION

| | | |
|---|---|---|
| PATENT NO. | : 8,645,680 B2 | Page 1 of 1 |
| APPLICATION NO. | : 12/997913 | |
| DATED | : February 4, 2014 | |
| INVENTOR(S) | : Blom et al. | |

It is certified that error appears in the above-identified patent and that said Letters Patent is hereby corrected as shown below:

On the title page item (57), under "ABSTRACT", in Column 2, Line 6,
delete "trans-protocol form" and insert -- transform --, therefor.

In the Specification,
In Column 7, Line 23, delete "hob-by-hop" and insert -- hop-by-hop --, therefor.

Signed and Sealed this
Twenty-first Day of April, 2015

Michelle K. Lee
*Director of the United States Patent and Trademark Office*